United States Patent
Sugahara et al.

(10) Patent No.: US 6,684,281 B1
(45) Date of Patent: Jan. 27, 2004

(54) FAST DELIVERY OF INTERRUPT MESSAGE OVER NETWORK

(75) Inventors: Hirohide Sugahara, Kawasaki (JP); Jeffrey D. Larson, San Jose, CA (US); Takashi Miyoshi, San Jose, CA (US); Takeshi Horie, Palo Alto, CA (US)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 09/705,451

(22) Filed: Nov. 2, 2000

(51) Int. Cl.[7] ............................................... G06F 13/24
(52) U.S. Cl. ........................ 710/260; 710/263; 710/266
(58) Field of Search ................................. 710/260–269

(56) References Cited

U.S. PATENT DOCUMENTS

| | | | |
|---|---|---|---|
| 5,675,807 A | * 10/1997 | Iswandhi et al. | 710/260 |
| 5,848,279 A | * 12/1998 | Wu et al. | 710/268 |
| 5,915,088 A | * 6/1999 | Basavaiah et al. | 1/1 |
| 6,233,636 B1 | 5/2001 | Kelley et al. | 710/126 |
| 2001/0032287 A1 | * 10/2001 | Lai et al. | 710/260 |

OTHER PUBLICATIONS

"Getting Started with the 21554 Embedded PCI–to–PCI Bridge," Intel Corporation, Application Note, 14 Pages, Order No.: 278210–001, Sep. 1998.

* cited by examiner

Primary Examiner—Glenn A. Auve
Assistant Examiner—Trisha Vu
(74) Attorney, Agent, or Firm—Fenwick & West LLP (57) ABSTRACT

A computer network system and a method for fast delivery of an interrupt message over a computer network enables a first processor coupled to the computer network to very quickly send an interrupt message to a second processor coupled to the computer network, by directly writing the interrupt message to a doorbell address range associated with the second processor in the PCI memory space of a first PCI bus to which the first processor is coupled. The doorbell address range is mapped to a doorbell space in the PCI memory space of a second PCI bus to which the second processor is coupled. The first PCI bus is coupled to the computer network through a first PCI network adaptor, which processes the write transaction and send it to the network. The second PCI bus is coupled to the computer network through a second PCI network adaptor, which receives the write transaction from the network and transforms the write transaction into an interrupt message to the second processor.

17 Claims, 8 Drawing Sheets

FAST DELIVERY OF INTERRUPT MESSAGE OVER NETWORK

RELATED APPLICATIONS

This application relates to the subject matter, of U.S. application Ser. No. 09/839,954 filed by Hirohide Sugahara, et al. on Apr. 19, 2001 and U.S. application Ser. No. 09/785,071 filed by Hirohide Sugahara, et al. on Feb. 14, 2001.

FIELD OF THE INVENTION

The present invention relates generally to computer networking, and more particularly to sending notification over a computer network.

BACKGROUND OF THE INVENTION

In a computer network made of interconnected processors, memories, input/output and/or other devices, these processors, memories, input/output and/or other devices may need to notify each other about certain events. For example, an interrupt signal may be sent from one device to a processor, indicating that an event has occurred and that the processor receiving the interrupt should suspend its current task to service a designated activity associated with the event. Interrupts are usually sent through interrupt request lines, or IRQs. The IRQs are hardware lines over which a processor receives interrupt signals from devices or other processors. There may be multiple IRQs associated with a processor, and each is routed to one or more devices in the computer network. When a processor receives an interrupt signal, it takes a specified action. The processor may choose to ignore the interrupt, or it may try to identify the source of the interrupt and then invoke an interrupt handler routine to respond to the interrupt. Typically, when an interrupt is sent over an IRQ, no information on the particular device which sent the interrupt is provided. The processor receiving the interrupt would have to poll the devices to which the interrupt line is routed in order to determine which device actually sent the interrupt. When the initiator of the interrupt signal is an intelligent device such as a central processing unit, it can send a more sophisticated notification such as an interrupt message to another processor. The processor receiving the interrupt message can determine the source of the notification and can obtain other information such as status or error information of the initiator of the notification by reading the interrupt message.

Traditionally interrupt messages are sent over a computer network using a technique called message passing. A common use of message passing is for communication in parallel computing, where a process running on one processor may send a message to a process running on the same processor or another processor. In a computer network where message passing is utilized, each processor has its own private memory. When a local processor sends a message to a remote processor using message passing, a block of memory is read locally and written remotely. This operation requires that sufficient memory is available to buffer the message at its destination and at intermediate nodes. Software run by the sending processor prepares data to be sent in its local memory and the data is transferred to a prepared memory buffer associated with the receiving processor. Before the sending processor transfers the data through the network, it needs to check with the receiving side for the address to store the data. These procedures are time consuming and make message passing inefficient when dealing with a message as small as a conventional interrupt message.

Therefore, there is a need for a system and a method that allows a processor coupled to a computer network to send an interrupt message over the network to another processor without going through the aforementioned procedures.

SUMMARY OF THE INVENTION

The present invention comprises a method and system for fast delivery of an interrupt message from a first processor to a second processor in a computer network.

In one embodiment of the present invention, the first and second processors are coupled to a first and second Peripheral Component Interconnect ("PCI") buses, respectively. A first and second PCI network adaptors are used to couple the first and second PCI buses, respectively, to the computer network. The first and second PCI network adaptors include functional units to facilitate a memory-mapped write on the first PCI bus to be bridged to the second PCI bus through the computer network.

One embodiment of the present invention allows the first processor to very quickly send a processor-to-processor interrupt along with queuing a four byte or eight byte message using only a single-memory-mapped PCI write to a doorbell address range associated with the second processor. A PCI write on the first PCI bus to the doorbell address range associated with the second processor is accepted by the first PCI network adaptor and is routed to the second PCI network adaptor. The second network adaptor recognizes the PCI write as a write to the doorbell space and cause an IRQ be asserted for the second processor and the queuing of the write data into one of a circular buffer.

DETAILED DESCRIPTION OF THE INVENTION

Figure 1:
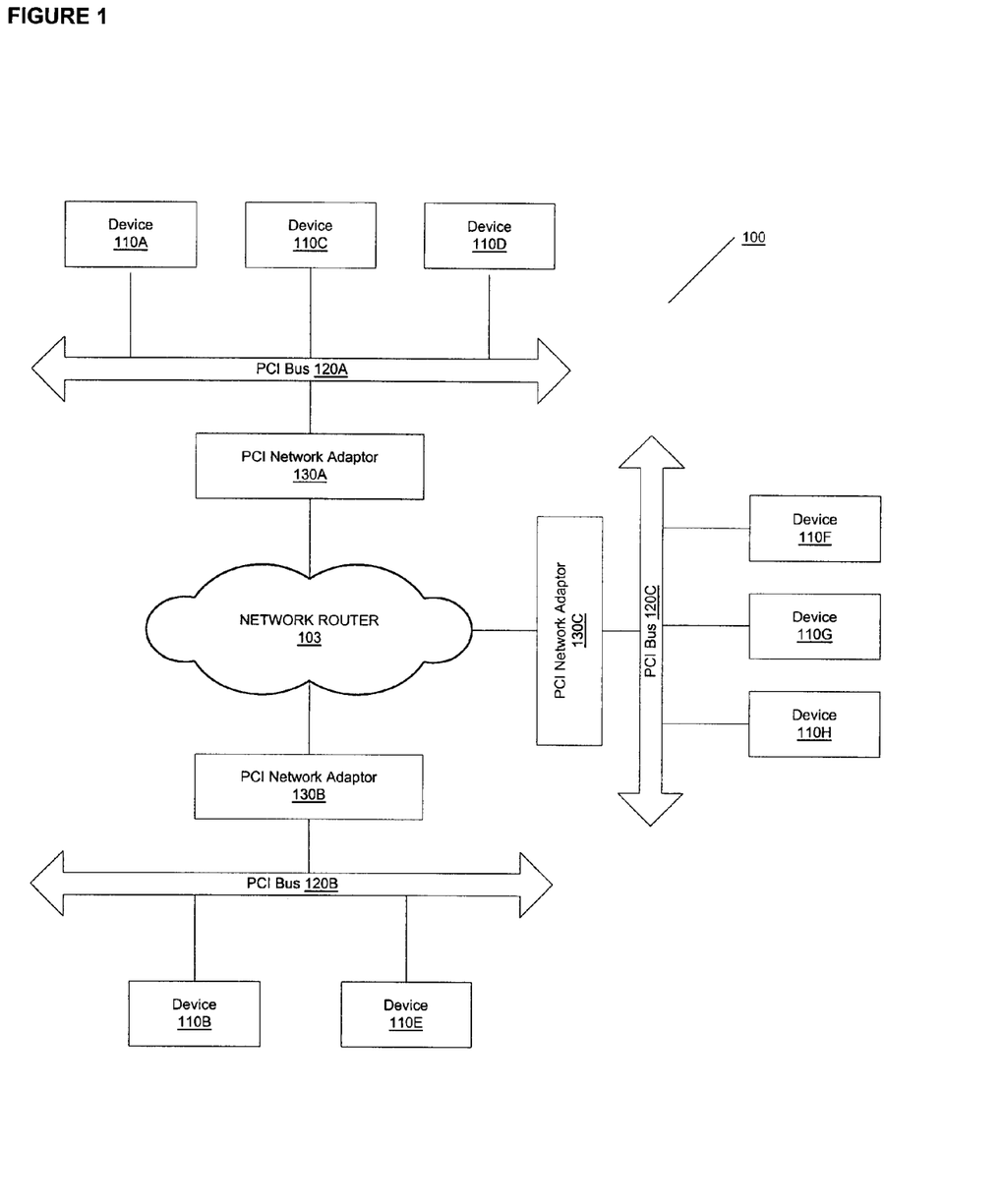
FIG. 1 is a block diagram of an overview of a computer network in accordance with one embodiment of the present invention.

FIG. 1 is a block diagram of an overview of one embodiment of the present invention, a computer network ("network") 100 comprising a network router 103 and three nodes, nodes A–C, coupled to the network router 103. Node A includes devices 110A and 110C–D which are coupled to a peripheral component interconnect ("PCI") bus 120A. The PCI bus 120A is coupled to the network router 103 through a PCI network adaptor 130A. Node B includes devices 110B and 110E which are coupled to a PCI bus 120B. The PCI bus 120B is coupled to the network router 103 through a PCI network adaptor 130B. Node C includes devices 110F–H which are coupled to a PCI bus 120C. The PCI bus 120C is coupled to the network router 103 through a PCI network adaptor 130C.

Each of the devices 110A–H in the network 100 is referred to as a device 110. Device 110 can be a conventional PCI device such as a display, a disk drive, a sound card, a small computer standard interface ("SCSI") adapter, or the like. Device 110 can also represent a conventional workstation or personal computer on a network, or it can represent an entire network. Alternatively, device 110 can represent a specialized node. For example, device 110 can be a data vault comprising a Direct Memory Access (DMA) device or disk controller card coupled to one or more storage devices. Furthermore, device 110 can represent an unintelligent node, such as an I/O device. On the other hand, device 110 can also represent an intelligent node that has a resident central processing unit (CPU) or microcontroller unit of some kind. In short, device 110 can be any one of a number of devices or node configurations. It is noted that devices 110 may alternatively be referred to as a peripheral or peripheral device.

Although two or three peripherals are shown to be coupled to each of the PCI buses 120A–C, either fewer or more peripherals can be connected to any one PCI bus depending on the desired application and system performance.

Each of the PCI network adaptors 130A–C provides a PCI interface for implementing conventional PCI protocols and ordering rule, so that the peripheral devices 110 can communicate with each other using PCI protocols. In an alternative embodiment, two PCI buses may be coupled to one network adaptor and the network adaptor serves as both a bridge between the two PCI buses and part of a bridge between any of the two PCI buses and a third PCI bus across the network 103.

Figure 2:
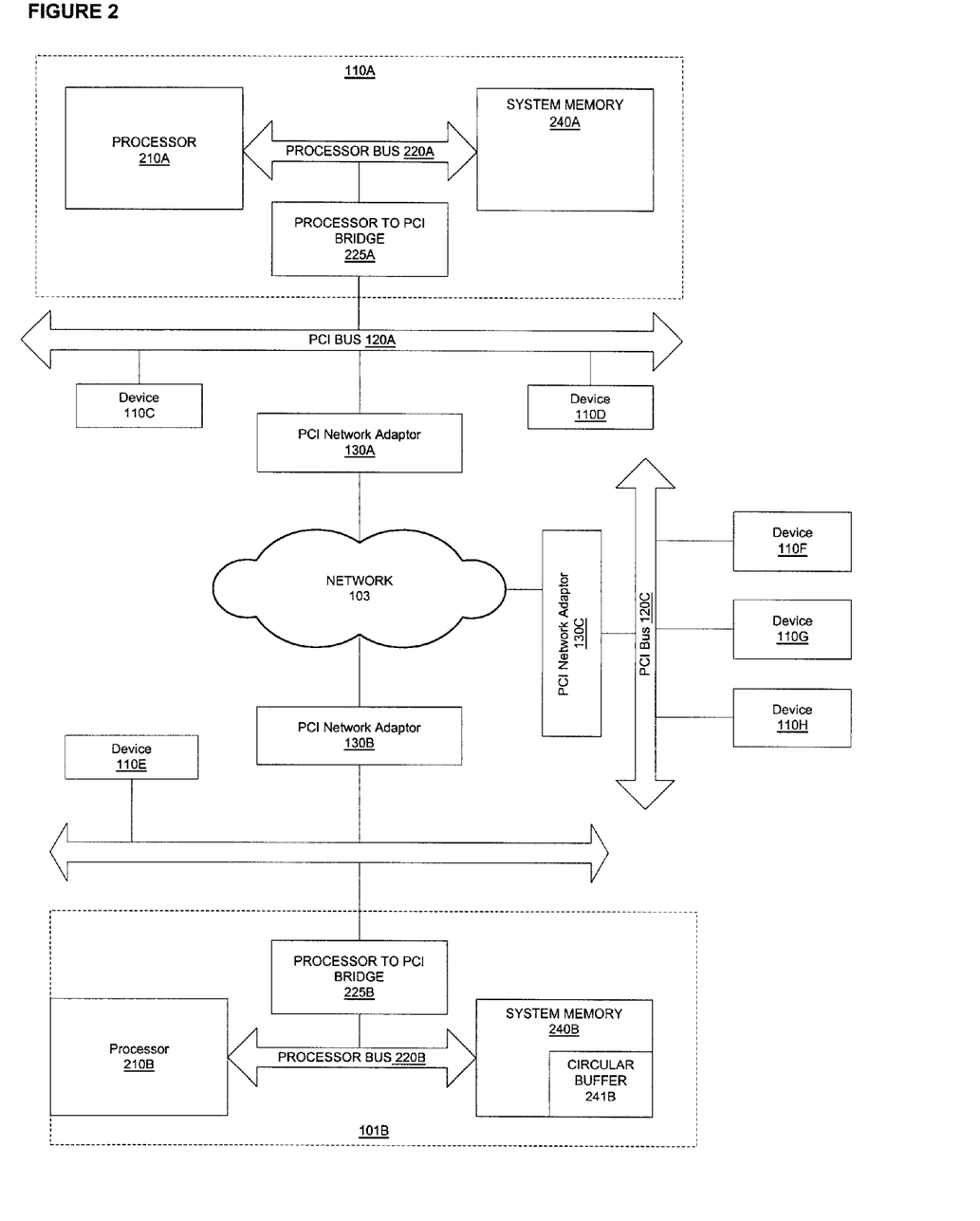
FIG. 2 is a block diagram of a computer network comprising two computer systems in accordance with one embodiment of the present invention.

FIG. 2 is a diagram showing the computer network 100 in which device 110A is a computer system comprising a processor 210A and a system memory 240A. The processor 210A and the system memory 240A interact through a processor bus 220A, which is bridged to the PCI bus 120A through a processor to PCI bridge 225A. FIG. 2 also shows that device 110B is a computer system comprising a processor 210B and a system memory 240B. The system memory 240B includes one or more circular buffers 241B for queuing interrupt messages sent to the processor 210B. The processor 210B and the system memory 240B interact through a processor bus 220B, which is bridged to the PCI bus 120 B through a processor to PCI bridge 225B.

One feature of the network 100 is that the PCI network adaptor 130A, the network router 103, and the PCI network adaptor 130B together act as a PCI bridge between the PCI bus 120A and the PCI bus 120B. This bridging allows a memory-mapped PCI read or write on the PCI bus 120A to be bridged to the PCI bus 120B, or vise versa. Therefore the processor 210A in the computer system 10A may directly access the system memory 240B of the computer system 110B by remotely access the memory space of the PCI bus 120B with memory mapped reads and writes.

At any node in the network 100, such as node A, a processor, such as processor 210A, possesses the ability to address the address spaces of the PCI bus of the node, such as the PCI bus 120A. There are two distinct PCI address spaces (i.e., an Input/Output ("IO") space and a memory space) associated with each of the PCI buses in the network 100. The memory space associated with a PCI bus is, for example, either 4 gigabytes ("GB") or $2^{64}$ locations in size (if, for example, 64-bit addressing is utilized). When the network 100 is configured by a conventional configuration program, all of the devices in the network 100 are assigned mutually exclusive address spaces in the address spaces of each of the PCI buses 120 A–C. The computer network 100 can be configured by a processor in one master node, such as the processor 210A at node A, or it can be configured independently by more than one processors in different nodes, such as processors 210A and 210B. The configuration program run by any of the nodes automatically detects the presence, type and address space requirements of the devices and allocates spaces to them by programming their address decoders to recognize the address range it assigns to them.

To the processor 210A, the devices 110B, 110E 110F, 110G and 110H are a community of devices that reside behind the PCI network adaptor 130A. These devices may be memory, IO, or a combination of memory and IO devices. Furthermore, some of the IO devices may be mapped into memory space while others are mapped into IO space.

In the memory space of a PCI bus 130A, all memory devices or memory mapped IO devices that reside behind the PCI network adaptor 130A are assigned mutually-exclusive memory address ranges within a common overall range of memory locations associated with the PCI network adaptor 130A. The PCI network adaptor 130A may also incorporate some memory and/or IO locations within itself that are utilized as registers. The PCI network adaptor 130A is programmed to process any memory transactions detected on the PCI bus 120A if the target address is within this common overall range of memory locations associated with the PCI network adaptor 130A.

Figure 3A:
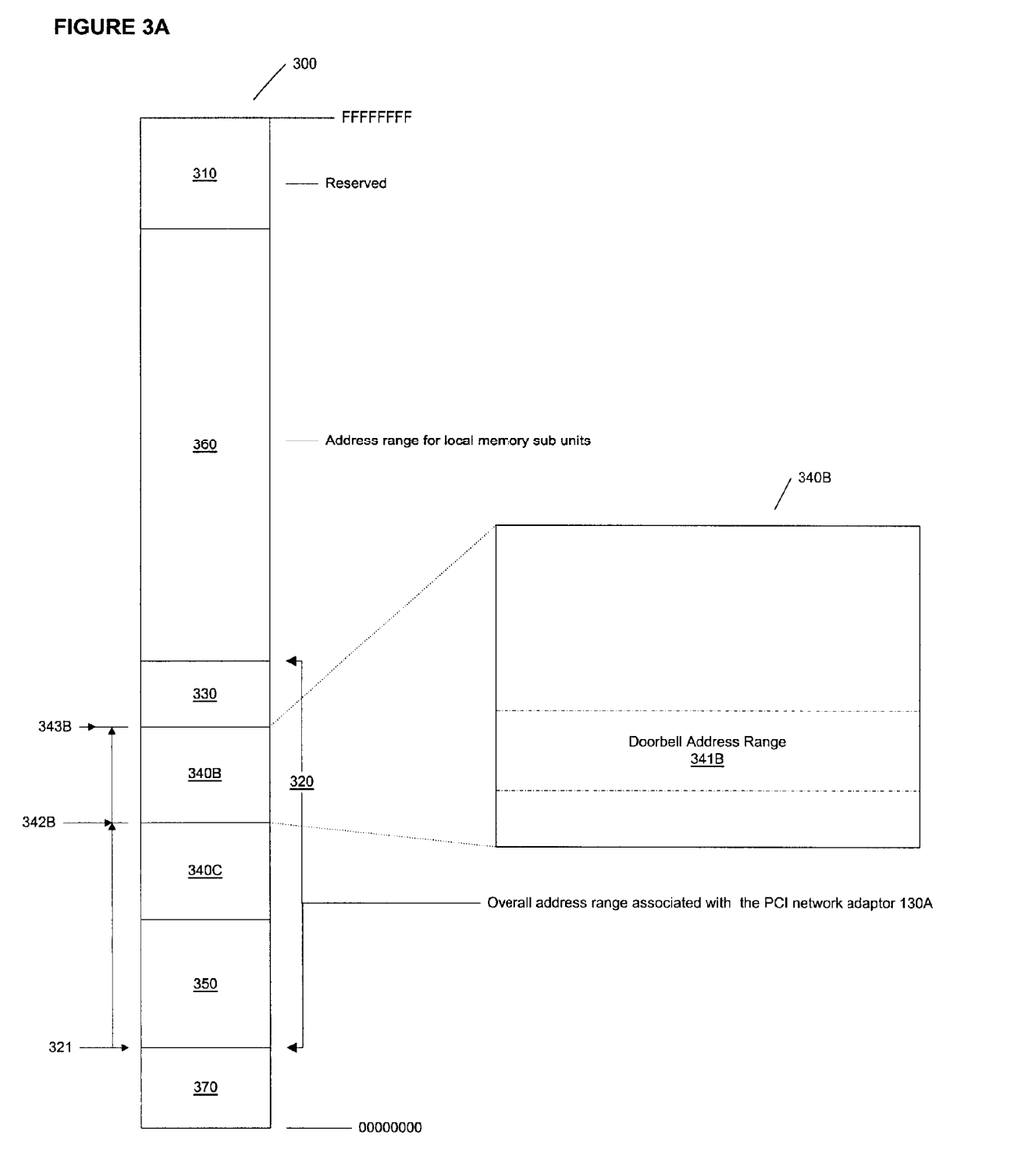
FIG. 3A is a block diagram of a PCI memory space according to one embodiment of the present invention.

As an example, FIG. 3A is a block diagram showing a memory space 300 of the PCI bus 120A. The memory space 300 includes an address space 360 used to access local memories, such as system memory 240A. The memory space 300 also includes an overall address range 320 associated with the PCI network adaptor 130A, which includes a memory mapped register space 330 assigned to the internal registers of the PCI network adaptor 130A, an address space 350 for remote I/O operations, and address spaces 340B and 340C for remote direct memory access ("RDMA") to the memory devices or memory sub units associated with node B and C, respectively. The memory space 300 also includes a reserved address range 310, and one or more other address spaces 370.

Each of the PCI network adaptors 130A–C in the network 100, such as the PCI network adaptor 130A, includes registers that are used to define the address space allocated to devices at other nodes (such as node B and node C) of the network 100. An address space is defined by a base address and an address offset. The base address of an address space serves as a reference point for other addresses in the address space. Any other address within the address space may then be specified by adding an offset to the base address. The largest offset within an address space represents the address offset of the address space. For example, as shown in FIG. 3A, the address space 340B is defined by a base address 342B and an address offset 343B. Since the address space 340B resides within the address space 320, FIG. 3A also shows that the base address 342B of the address space 340B is represented as an offset from the base address 321 of the address space 320. Any address within the address space 340B is determined in reference to both the base address 342B of the address space 340B and the base address 321 of the address space 320, and may be written in the following format when, for example, 64-bit addressing is used:

The exact number of bits in the base addresses 321, 342B and the offset depend on specific implementation.

The PCI network adaptor 130A, 130B or 130C typically include registers for the base addresses and address offsets of the following address spaces:

a) memory mapped register space (such as address space 330 in FIG. 3);

b) remote IO space associated with other nodes of the network 100 (such as address space 350 in FIG. 3);

c) remote direct memory access (RDMA) space associated with other nodes of the network 100 (such as address ranges 340B or 340C in FIG. 3).

Any access to space b) or c) from a node, such as node A, is processed by a local PCI network adaptor, such as the PCI network adaptor 130A, and transferred to a remote PCI network adaptor, such as the PCI network adaptor 130B or 130C, through the network router 103. This access typically appears at a remote PCI bus associated with the remote network adaptor as an access to an address space in the memory space of the remote PCI bus.

In one embodiment of the present invention, within each address space for RDMA or remote IO access, there is a doorbell address range. This doorbell address range is mapped to a doorbell space in the memory space of a PCI bus at the remote node with which the address space is associated. For example, as shown in FIG. 3, the address space 340B includes a doorbell address range 341B. This doorbell address range 341B is mapped to a doorbell space in the memory space of the PCI bus 120B at node B of the computer network 100. One purpose of this mapping is to allow a processor coupled to a PCI bus at one node in the network 100 to send an interrupt message to another processor at a remote node by performing a PCI write to the doorbell range associated with the remote node. The PCI write will be routed to the PCI network adaptor at the remote node and be recognized as a PCI write access to the doorbell space of a PCI bus at the remote node. The recognition of a write access to the doorbell space of the PCI bus at the remote node of the network 100 will cause the write data to be queued as an interrupt message and an IRQ to be asserted on the PCI bus.

Figure 3B:
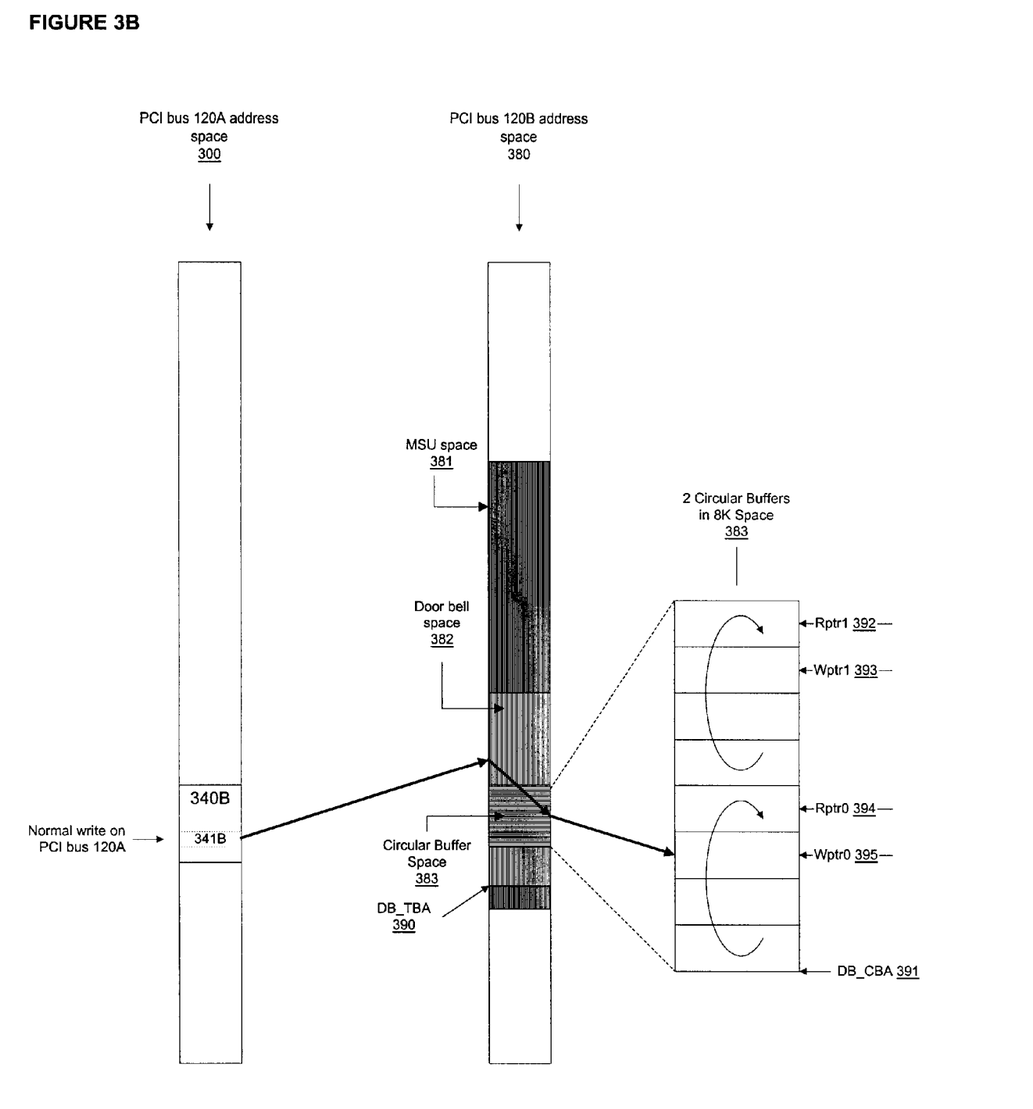
FIG. 3B is a block diagram illustrating how a PCI write to a doorbell address range is transformed into an interrupt message.

FIG. 3B is a diagram illustrating an example of how a PCI write to the doorbell range 341B is transformed into an interrupt message, according to one embodiment of the present invention. FIG. 3B shows, in addition to the memory space 300 of the PCI bus 120A, a memory space 380 of the PCI bus 120B. The memory space 380 includes an address space 381 associated with a memory sub unit ("MSU") which, in this example, is the system memory 240B of the device 110B. Within the MSU space 381, there is a doorbell space 382 to which the doorbell address range 341B is mapped. In one embodiment of the present invention, when 64-bit addressing is used, any address in the doorbell space 381 may be determined in reference to a base address of the doorbell space, DB_TBA 390, and may be written by adding an offset to DB_TBA as, for example, in the following:

The exact number of bits of DB_TBA and the offset depend on specific implementation.

The doorbell space 382 is mapped to a circular buffer space 383 in the MSU space 381, and the circular buffer space 383 is associated with one or more circular buffers 241B in the system memory 240B. Any address in the circular buffer space may be determined in reference to a base address of the circular buffer space DB_CBA 391 and that of the doorbell space DB_TBA 390, and may be written by adding an offset to DB_CBA and DB_TBA as, for example, in the following:

The exact number of bits of DB_CBA and the offset depend on specific implementation.

In one embodiment of the present invention, the circular buffers 241B are two 4 kilobyte (4 K) circular buffers in continuous 8 K memory region within the system memory 240B. Each of the 4 K circular buffers includes a stack of 8-byte memory spaces. A write pointer ("Wptr0 or Wptr1") and a read pointer ("Rptr0 or Rptr1") are associated with each of the 4 K circular buffers. The PCI network adaptor 130B includes registers for storing DB_TBA, DB_CBA, Wptr0, Wptr1, Rptr0 and Rptr1. The write pointer associated with a circular buffer points to an 8-byte memory space in the circular buffer for queuing an incoming interrupt message. The read pointer associated with a circular buffer points to an 8-byte memory space where an interrupt message is queued and has not been read. When a circular buffer is empty, e.g., before any message is queued into the circular buffer, both the write pointer and the read pointer of the circular buffer should point to the first 8-byte memory space of the circular buffer. Each time an interrupt message is queued in the 8-byte memory space pointed by the write pointer, the write pointer is typically advanced to point to the next 8-byte memory space within the circular buffer. Each time a queued interrupt message is read, the read pointer is typically advanced to point to the next 8-byte space within the circular buffer. The next 8-byte space of the last 8-byte space of the circular buffer is the first 8-byte space of the circular buffer. Therefore, when the write pointer or the read pointer reaches the end of a circular buffer, it circles back to the beginning of the circular buffer. If the next 8-byte memory space is pointed by the read pointer associated with the circular buffer, meaning that the buffer is full of unread messages, the write pointer will not be advanced, so that the unread message(s) will not be overwritten.

Therefore, the processor 210A may send a 4-byte or 8-byte interrupt message to the processor 210B by directly writing the 4-byte or 8-byte interrupt message into the doorbell address range 341B. A PCI write to anywhere within the doorbell range 341B mapped to anywhere in the doorbell space 382 will be recognized by the PCI network adaptor 130B as an interrupt message directed to a processor coupled to the PCI bus 120B. In response to such a recognition, the PCI network adaptor will cause the queuing of the 4-byte or 8-byte message into an 8-byte address space as pointed by a write pointer in one of the two 4 K circular buffers, and will raise an IRQ to cause an interrupt. The PCI network adaptor 130A, 130B or 130C includes functional units for exchanging PCI transactions, e.g., a PCI write transaction, from a device coupled to one PCI bus to a device coupled to another PCI bus in the computer network 100. The PCI network adaptor 130A, 130B or 130C also includes functional units for recognizing a PCI write to a doorbell space associated with the PCI bus 120A, 120B or 120C, respectively, and for transforming such a write transaction into an interrupt message by queuing the message into a circular buffer and asserting an IRQ to cause an interrupt.

Figure 6:
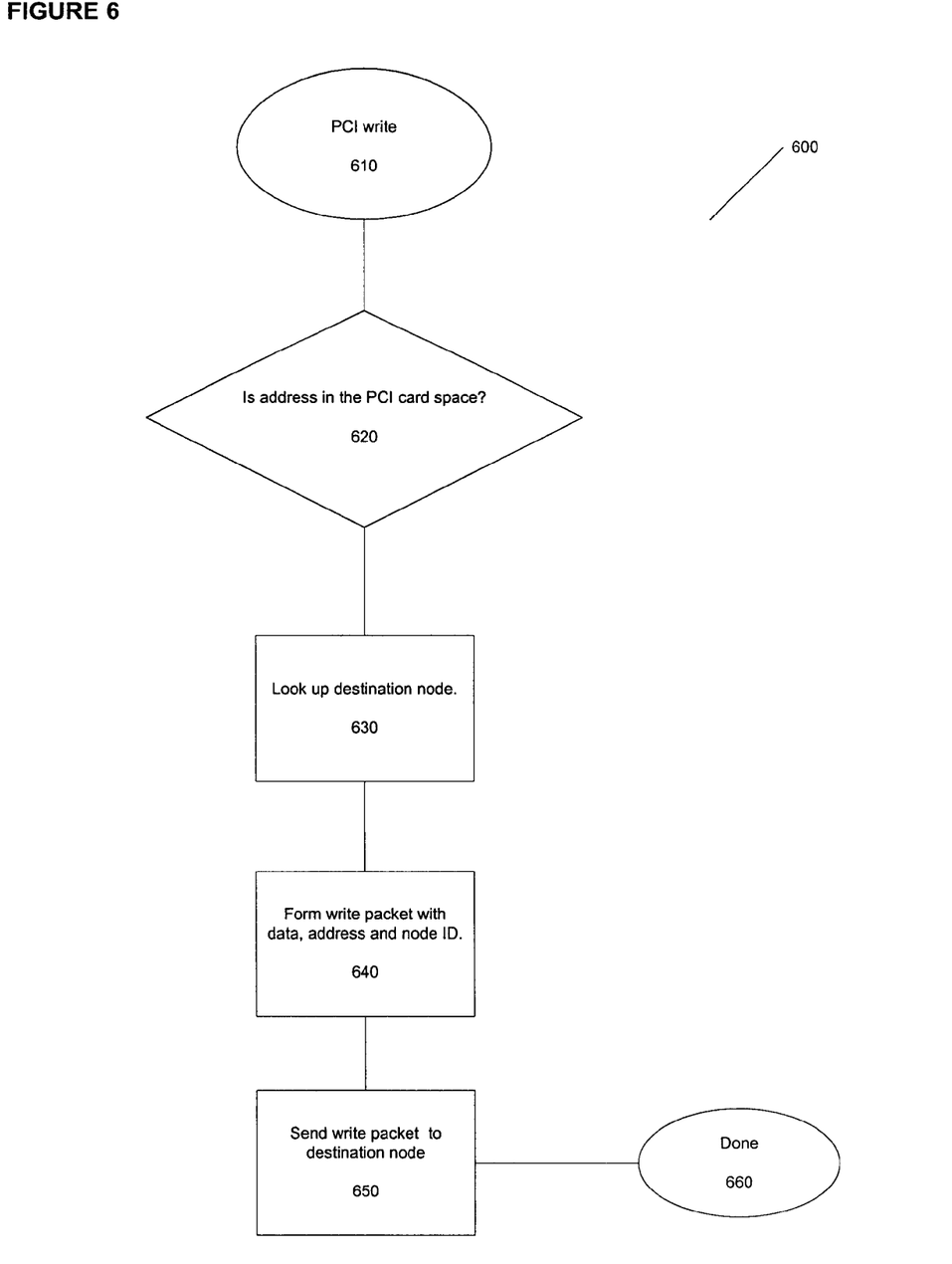
FIG. 6 is a flow chart illustrating a memory mapped write process performed by an interrupt initiating node.

FIG. 6 is a flow chart illustrating a process 600 performed by a sending node, such as node A, of the interrupt message. A processor at node A, such as the processor 210A, initiate the interrupt message by posting a PCI write 610 on the PCI bus 120A. The PCI write includes a write data representing the interrupt message and a write address in the doorbell address range associated with another processor at another node, such as processor 210B at node B. The network adaptor 130A determines 620 if the write address is in the overall address range associated with the PCI network adaptor 130A. If true, it receives the PCI write and look up a destination node 630 based on the write address. It then forms a write packet 640 with the write data, the write address and the destination node, and send 650 the write packet to the network router 103.

Figure 7:
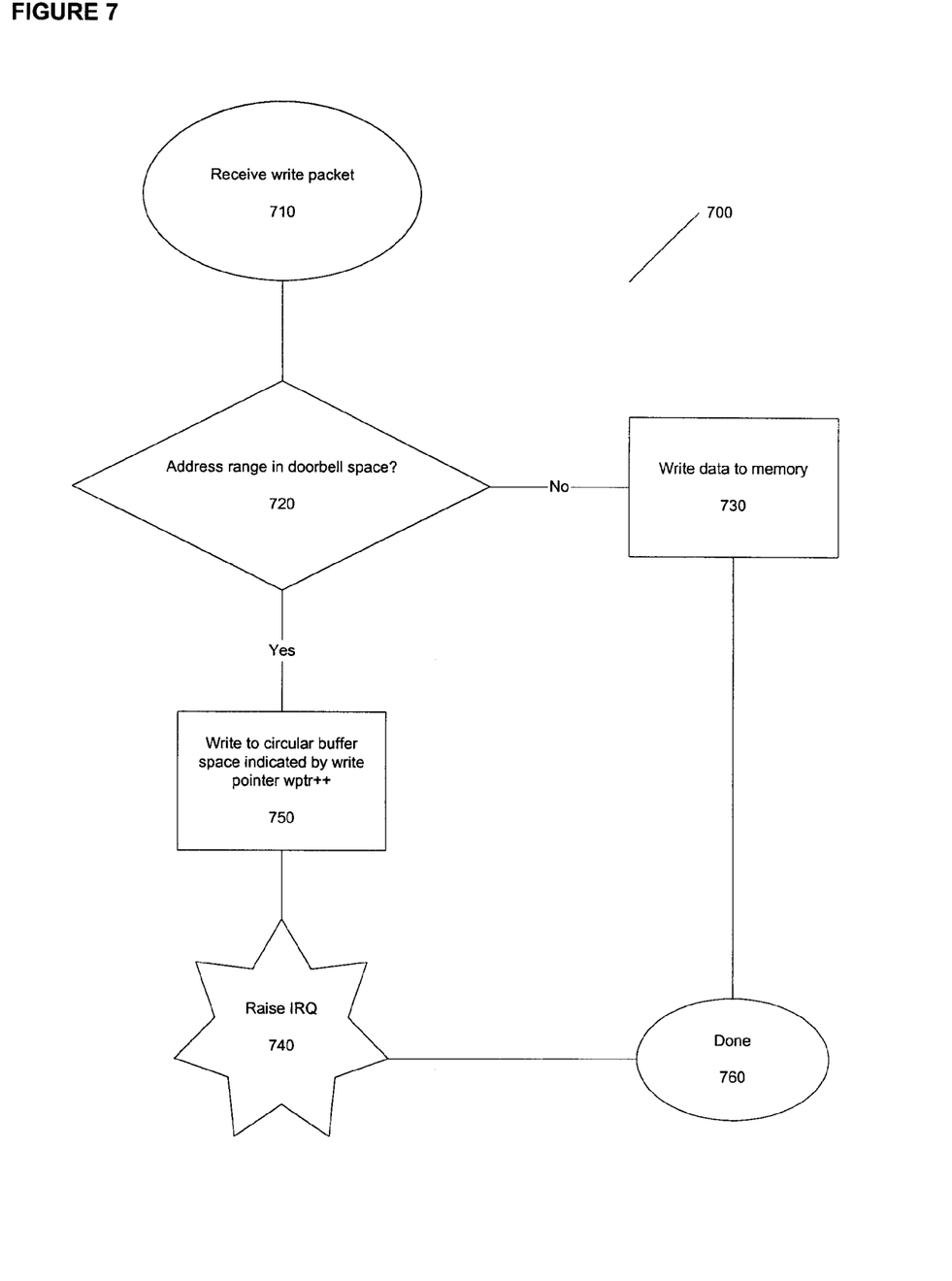
FIG. 7 is a flow chart illustrating a process of transforming a memory mapped write into an interrupt message at a receiving node.

FIG. 7 is a flow chart illustrating a process 700 performed by a receiving node, such as node B of the interrupt message. The PCI network adaptor at the receiving node, such as the PCI network adaptor 130B at node B, receives 710 the write packet which includes a node ID identifying node B as the receiving node. The PCI network adaptor then translates the write address included in the write packet and determines 720 whether the translated address is in the range of the doorbell space of the PCI bus 120B. If not true, the PCI network adaptor 120B will treat the write packet as a normal write transaction and write 730 the write data into a memory space as indicated by the translated address. If true, the PCI network adaptor 120B will recognize the write transaction as an interrupt message. In response to this recognition, the PCI network adaptor will write the write data into a circular buffer 750 and raise an IRQ 740.

Figure 5:
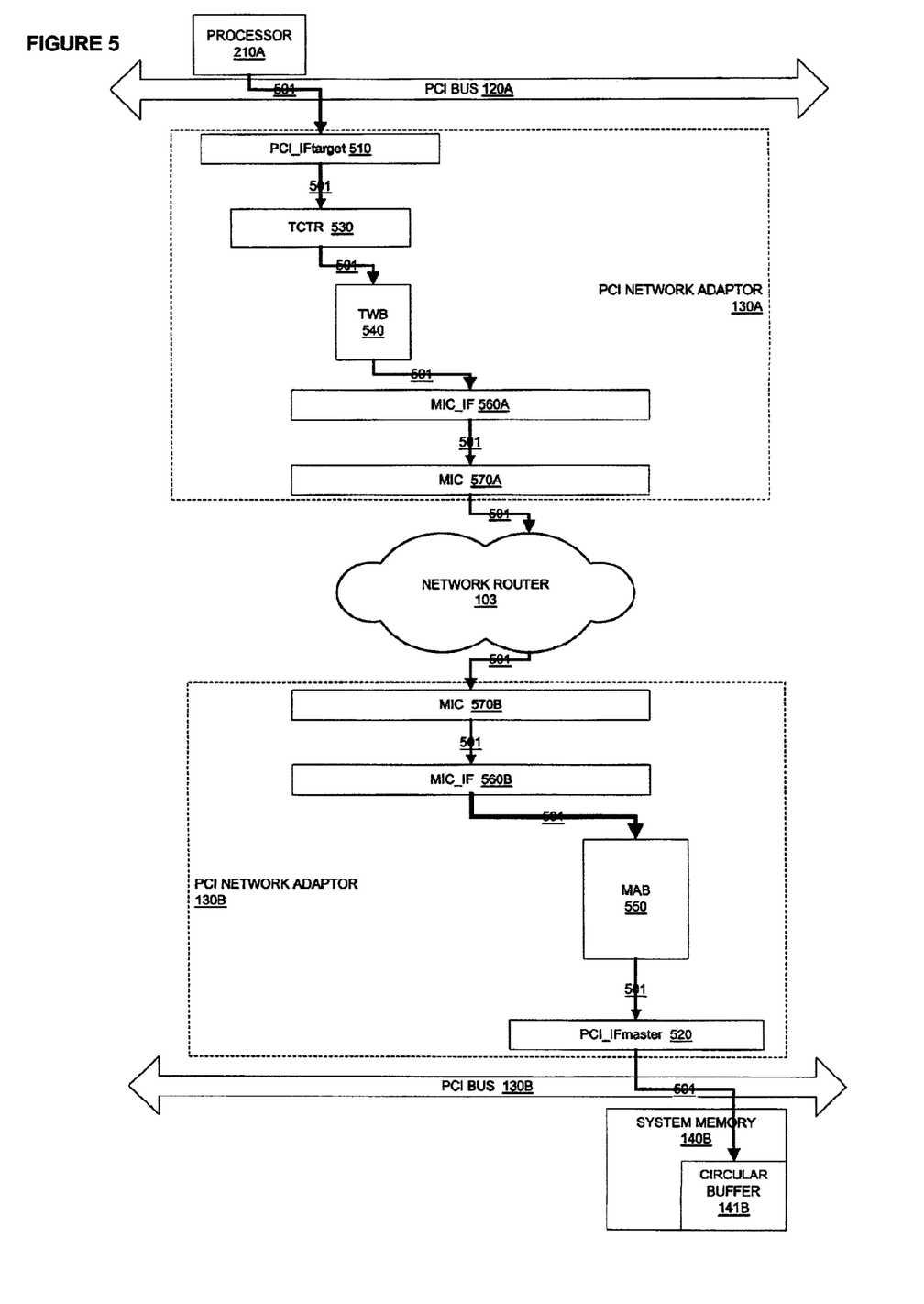
FIG. 5 is a block diagram showing a path of an interrupt message through some of the logical components comprising the PCI network adaptors.

As an example, FIG. 5 is a diagram showing a path 501 taken by an interrupt message sent by processor 210A to processor 210B through the functional units included in the PCI adaptors 130A and 130B, in accordance with a preferred embodiment of the present invention. As illustrated in FIG. 5, the PCI network adaptor 130A includes a PCI interface ("PCI_IF") target unit 510 coupled to the PCI bus 120A for recognizing and receiving a PCI write to the overall address range assigned to the PCI network adaptor 130A and for providing an interface between the PCI bus 120A and the core functions of the PCI network adaptor 130A. The PCI network adaptor 130A also includes a target write buffer ("TWB") unit 540 for buffering write transactions, and a target control (TCTR) unit 530 coupled to the PCI_IF unit 510 and to the TWB unit 540 for receiving a PCI write transaction from the PCI_IF target unit 510 and for distributing it to the TWB unit 540. The PCI network adaptor 130A also includes a mesh interface chip ("MIC") unit 570A for providing an interface between the functional units within the PCI network adaptor 130A and the network router 103. The MIC unit 570A provides devices directly coupled to the PCI bus 120A access to the network router 103. The PCI network adaptor also includes a MIC interface ("MIC_IF") unit 560A coupled to the TWB unit and to the MIC unit 570A for transferring data packets between the TWB unit and the MIC unit 570A.

As also shown in FIG. 5, the PCI network adaptor 130B includes a PCI_IF master unit 520 coupled to the PCI bus 120B for providing an interface between the PCI bus and the core functions of the PCI network adaptor 130B. The PCI network adaptor 130B also includes a master access buffer ("MAB") unit 550 coupled to the PCI_IF master unit 520 for receiving write request from the TWB unit in another PCI network adaptor (such as the TWB unit 540 in the PCI network adaptor 130A) and for accessing the PCI bus 120B through the PCI_IF master unit 520. The PCI network adaptor 130B also includes a MIC unit 570B for providing an interface between the functional units within the PCI network adaptor 130B and the network router 103, and a MIC_IF unit 560B coupled to the MAB unit 550 and to the MIC unit 570B for transferring data packets between the MIC unit and the MAB unit 550.

In an alternative embodiment where more than one PCI bus are coupled to a network router through a PCI network adaptor, there may be one PCI_IF target unit, one target control unit, one target write buffers, one master control buffers and/or one PCI_IF master unit for each PCI bus in the PCI network adaptor.

Figure 4A:
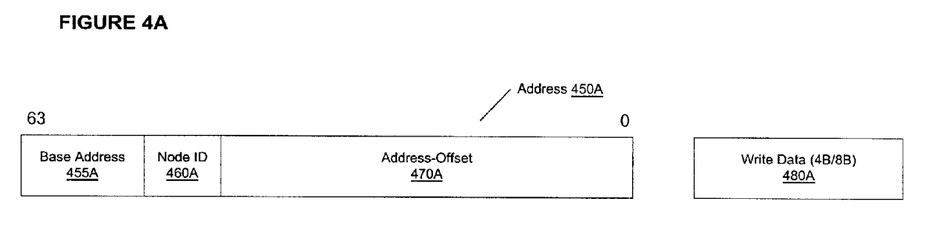
FIG. 4A is a block diagram illustrating a write address and write data associated with a PCI write transaction at an initiating node in a computer network in accordance with one embodiment of the present invention.

FIG. 3B and FIGS. 4A–C together illustrate an address translation process associated with the processing of an interrupt message, according to one embodiment of the present invention. As shown in FIG. 4A, the processor 210 sends the interrupt message to the processor 210B by posting a 4-byte or 8-byte write data 480A representing the interrupt message and a 64-bit write address 450A which falls in the address range 341 B on the PCI bus 120A. The write address 450A comprises a base address part 455A, a node ID part 460A and an address offset 470A. The bit assignments for these parts are implementation dependent and are configurable. Upon the determination that the base address part 455A matches the base address 321 of the overall address range 320 associated with the PCI network adaptor 130A, the PCI_IF target unit 510 will detect the PCI write as a remote access and receives the write data 480A and write address 450A. The PCI_IF target unit 510 will then calculate a destination node ID based the node ID part 460A. The PCI_IF target unit 510 will then pass the write data together with the destination node ID and the address offset 470A to the TCTR unit 530.

In response to receiving the write data, the node ID and the address offset, the TCTR unit 530 forms write block queues in the TWB unit 550 according to the destination node ID and the address offset. The MIC_IF unit 560A takes the write data 480A, the node ID 460A and the address offset 470A from the TWB 550 and generates a write packet for the PCI write transaction. The write packet includes a header and a payload. The header includes information such as a source node ID, the destination node ID, type of command, packet length, etc. The payload is the write data in this case. The write packet is sent to the MIC unit 570A.

The MIC unit 570A sends the write packet to the network router 103 with routing information which comes from the destination node ID and a sequence number to keep ordering. The network router transmits the write packet to the MIC unit 570B based on the routing information which identifies the PCI network adaptor 130B as the recipient of the write packet.

When the write packet arrives at the PCI network adaptor 130B, the MIC unit 570B receives the write packet from the network router 103. After the MIC unit 570B performs sanity check and error correction, it sends the write packet to the MIC_IF unit 560B. In response to receiving the write packet, the MIC_IF unit 560B sends a write request including the header of the write packet to the MAB unit 550 and buffers the payload of the write packet into a data buffer in the MAB unit 550.

The MAB unit 550 includes a plurality of master access data buffers (MAB) and processes delivered write requests in the order of arrival. The MAB unit 550 decodes the header of the write packet and retrieves information such as the source node ID, the destination node ID, the address offset and the type of command, etc. The destination node ID, the address offset and the write data are sent to the PCI_IF master unit 520.

Figure 4B:
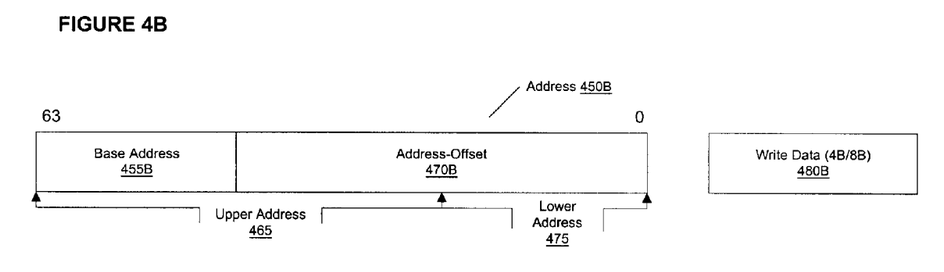
FIG. 4B is a block diagram illustrating a write address and write data associated with a PCI write transaction at a target node in a computer network in accordance with one embodiment of the present invention.

The PCI_IF master unit 520 does address translation. It also watches the write to doorbell region. If it is detected, the access address is changed to the address of the interrupt queue. For each PCI write transaction: from the network router, the PCI_IF master unit 520 determines a base address 455B (as shown in FIG. 4B) based on the type of transaction involved. For RDMA transactions, the base address 455B is the base address of the MSU space 381 in FIG. 3B. The PCI_IF unit 520 also determines an address offset 470B (as shown in FIG. 4B) based on the address offset 470A. As shown in FIG. 4B, the base address 455B and the address offset 470B forms a new address 450B in the memory space 380 of the PCI bus 120B. The new address 450B is then partitioned into an upper address 465 and a lower address 475. This partition may be logical or physical and may depend on specific implementation. However, the number of bits of the upper address should be the same as that of the base address of the doorbell space, DB_TBA 390, as shown in FIG. 3B.

Figure 4C:
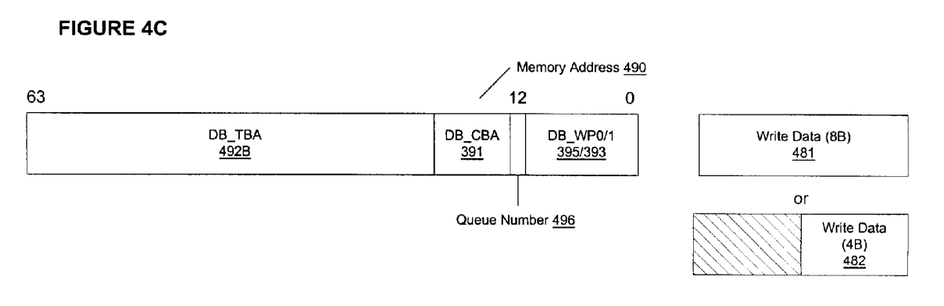
FIG. 4C is a block diagram illustrating a write address and write data associated with a PCI write transaction that has been translated into a door bell queue access at a target node in a computer network in accordance with one embodiment of the present invention.

The PCI_IF master unit 520 then compares the upper address 465 of the address 450B with the base address of the doorbell space 382, or DB_TBA 390. If the upper address 465 and DB_TBA 390 match, access to the doorbell space 382 is detected, and the PCI_IF master unit 520 translates address 450B into a circular buffer address 490 (as shown in FIG. 4C) by replacing bit 13 to the highest bit of the lower address 475 with the base address of the circular buffer space 383, or DB_CBA 391, and bit 0 to bit 11 of the lower address with the write pointer DB_WP0 395 or DBWP 393. Which write pointer to use is determined by bit 12 of the lower address.

The PCI_IF master unit 550 will post the write data together with the translated write address 490 on the PCI bus 120B. The posted write data will be written to an 8-byte space as indicated by the write pointer Wptr0 395 or Wptr1 393 of one of the two circular buffers. Which buffer to use is determined by bit 12 of the address offset 470B or by the queue number 496 in bit 12 of the address 490. If the write data is 8-byte, it will fill the 8-byte space 481. If the write data is 4-byte 482, it will occupy 4-byte of the 8-byte space 482 and leave the rest of the 8-byte space blank.

When the write data is written into the circular buffer, an IRQ is raised to cause an interrupt, and the write pointer associated with the circular buffer will be incremented and updated in the PCI network adaptor 130B by the PCI_IF master unit 520. In a rare situation when the door bell queue overflows, meaning that the queue is filled with unread messages, an IRQ is raised, but the write data is discarded and the write pointer won't be incremented.

When the processor 210B detects the interrupt signal, it may choose to respond to the interrupt signal by first reading the interrupt message. In order to do that it reads the registers in the PCI network adaptor 130B which stores the write pointers and read pointers of both circular buffers. The processor 210B determines which circular buffer to read by comparing the write pointer with the read pointer of each of the two circular buffers. For example, a circular buffer with at least one unread interrupt message should have its read pointer at least one space behind its write pointer. It is also possible for the PCI network adaptor 130B to have registers storing status bits that indicate which circular buffer queue has valid entries. After the processor 210B reads an 8-byte memory space of a circular buffer, it increments the read pointer of the circular buffer by performing a register write.

The embodiments of the present invention as described above enable a processor in a computer network to very quickly send an interrupt message to another processor in the computer network, by PCI writing the message to a certain address range in a PCI memory space. There is no need to make sure that sufficient memory is available to buffer the interrupt message at the destination node and at intermediate nodes of the computer network, and therefore, the embodiments of the present invention allows an interrupt message to be sent in a more efficient manner than conventional message passing methods.

It is noted that the principles of the present invention may also be used to overcome the disadvantages of other prior art methods of sending notifications over computer networks.

What is claimed is:

1. A system for delivering an interrupt message over a computer network, the system comprising:
    a first PCI network adaptor for receiving directly from a local device a PCI write request containing an interrupt message to a write address within a doorbell address range of memory of a first PCI bus, the doorbell address range associated with a remote device; and
    a second PCI network adaptor coupled to the first PCI network adaptor and to the remote device, for receiving the write request containing the interrupt message from the first PCI network adaptor and directly writing the interrupt message data into an interrupt message queue associated with the remote device.

2. The system of claim 1 wherein the write address comprises a first base address, and the first PCI network adaptor determines that the write address is in a range of memory locations associated with the first PCI network adaptor in the memory space of the first PCI bus by comparing the first base address with a second base address of the range of memory locations associated with the first PCI network adaptor in the memory space of the first PCI bus.

3. The system of claim 1 wherein the second PCI network adaptor determines that the write packet comprises an interrupt message by forming a second write address comprising a second base address and the address offset and by determining that the second write address is in a doorbell space in the memory space of the second PCI bus.

4. The system of claim 3 wherein the second base address is associated with a memory sub unit coupled to the second PCI bus.

5. The system of claim 3 wherein the second PCI network adaptor determines that the second write address is in the doorbell space by partitioning the second write address into an upper address and a lower address, and by comparing the upper address with a third base address, the third base address being the base address of the doorbell space.

6. The system of claim 5 wherein the second PCI network adaptor PCI writes the write data into an interrupt message queue by translating the second write address into a third write address, the third write address being in the address space associated with the interrupt message queue, and by posting a PCI write transaction on the second PCI bus with the third write address and the write data.

7. The system of claim 1, wherein the interrupt message queue includes at least one circular buffer.

8. The system of claim 7 wherein the at least one circular buffer includes a stack of memory spaces of a fixed size, each memory space for queuing an interrupt message.

9. The system of claim 7 wherein the at least one circular buffer resides in a memory sub unit associated with the second processor.

10. A method for a first device to send an interrupt message to a second device over a computer network, the method comprising:

receiving a PCI write directly to a memory address located in a memory address space of a first PCI bus, the memory address being within a doorbell address range associated with the second device;

determining a destination node ID associated with the second processor and an address offset based on the write address;

forming a write packet comprising the destination node ID, the address offset and the write data; and sending the write packet to the second device via the computer network.

11. The method of claim 10 wherein the doorbell address range is mapped to a doorbell space, which is mapped to a circular buffer space, the circular buffer space being associated with at least one circular buffer for queuing the write data representing the interrupt message.

12. The method of claim 11 wherein the at least one circular buffer resides in a memory sub unit associated with the second processor.

13. A method for transforming a write packet received from a first device into an interrupt message, the write packet comprising write data representing the interrupt message, the method comprising:

receiving the write packet including the write address and the write data representing the interrupt message from the first device;

generating a second write address from the first write address and an offset, the second write address pointing to an address space associated with a second device for queuing an interrupt message in a interrupt message queue;

writing the write data to the address space for queing the interrupt message; and asserting an IRQ associated with a second device.

14. The method in claim 13, wherein the write packet includes an address offset, and determining a first write address comprises:

determining a base address associated with a memory sub unit for storing the write data in the write packet;

combining the base address and the address offset to form the first write address.

15. The method of claim 13, wherein determining whether the first write address is in a doorbell space further comprises:

partitioning the first write address into an upper address and a lower address; and determining whether the upper address matches a base address of the doorbell space.

16. The method of claim 13, wherein the interrupt message queue includes at least one circular buffer.

17. The method of claim 16 wherein the at least one circular buffer includes a stack of memory spaces of a fixed size, each memory space for queuing an interrupt message.

* * * * *